United States Patent
Biehler

(10) Patent No.: US 11,959,542 B2
(45) Date of Patent: Apr. 16, 2024

(54) OIL SUPPLY SYSTEM WITH VACUUM PUMP FOR TRANSMISSION OF DRIVE SYSTEM

(71) Applicant: General Electric Company, Schenectady, NY (US)

(72) Inventor: Pierre Biehler, Belfort (FR)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/814,710

(22) Filed: Jul. 25, 2022

(65) Prior Publication Data

US 2023/0030818 A1 Feb. 2, 2023

(30) Foreign Application Priority Data

Jul. 30, 2021 (EP) ..................... 21306075

(51) Int. Cl.
*F16H 57/04* (2010.01)
*F16H 57/027* (2012.01)

(52) U.S. Cl.
CPC ....... *F16H 57/0436* (2013.01); *F16H 57/027* (2013.01); *F16H 57/0435* (2013.01); *F16H 57/045* (2013.01)

(58) Field of Classification Search
CPC ............ F16H 57/0427; F16H 57/0434; F16H 57/0435; F16H 57/045; F16H 57/0453; F16H 57/0454; F16H 57/0471; F01M 2011/0037; F01M 2011/0083; F16N 7/38; F16N 7/385; F16N 7/40
See application file for complete search history.

(56) References Cited

U.S. PATENT DOCUMENTS

| 3,800,913 A | | 4/1974 | Schmitt | |
|---|---|---|---|---|
| 4,002,224 A | * | 1/1977 | Easter | F01D 25/20 60/39.08 |
| 4,105,093 A | * | 8/1978 | Dickinson | F01D 25/20 184/104.1 |

(Continued)

FOREIGN PATENT DOCUMENTS

EP 3312477 A1 4/2018

OTHER PUBLICATIONS

Extended European Search Report from Application No. 21306075.9 dated Nov. 8, 2021.

*Primary Examiner* — Minh Truong
(74) *Attorney, Agent, or Firm* — Charlotte Wilson; James Pemrick; Hoffman Warnick LLC

(57) ABSTRACT

An oil supply system includes a first oil receptacle collecting oil from a transmission and a second oil receptacle collecting oil from the rest of a drive system using gravity. Oil supply pump(s) supply oil from the oil receptacle(s) to the different consumers. A vacuum pump generates a negative pressure in the first oil receptacle and in the transmission casing connected to the first oil receptacle. A gas check valve prevents gas from flowing between the oil receptacles when a pressure differential is applied to the oil receptacles by the vacuum pump. An oil check valve prevents oil from flowing between the oil receptacles when the pressure differential is applied. An oil regulating valve may control the oil flow between the first and second oil receptacles. The oil supply system provides a simpler configuration without scavenging pump(s).

18 Claims, 3 Drawing Sheets

(56) References Cited

U.S. PATENT DOCUMENTS

| | | | |
|---|---|---|---|
| 4,258,679 A * | 3/1981 | Leitermann | F01M 5/007 123/196 AB |
| 4,390,082 A * | 6/1983 | Swearingen | F01M 1/16 60/39.08 |
| 4,915,193 A * | 4/1990 | Marquart | F16H 57/0447 184/6.12 |
| 6,299,561 B1 * | 10/2001 | Kramer | F16H 57/0447 184/6.12 |
| 6,374,949 B2 | 4/2002 | Schwertberger | |
| 6,644,439 B2 * | 11/2003 | Schnitzer | F16H 57/0456 184/6.12 |
| 6,718,847 B2 * | 4/2004 | Rimkus | F16H 57/0447 184/6.12 |
| 6,786,188 B1 * | 9/2004 | Kawamoto | F01M 1/12 123/196 R |
| 7,878,304 B2 * | 2/2011 | Reis | F16H 57/0447 184/6.12 |
| 7,954,599 B2 | 6/2011 | Antonetti et al. | |
| 8,020,666 B2 * | 9/2011 | Yamashita | F16H 57/0447 184/26 |
| 9,322,466 B2 * | 4/2016 | Ebner | F16H 57/05 |
| 9,377,099 B2 * | 6/2016 | Gianone | F16H 57/0447 |
| 9,739,363 B2 * | 8/2017 | Schweiher | F16H 57/0457 |
| 10,060,520 B2 | 8/2018 | Sterns | |
| 10,094,466 B2 | 10/2018 | Sterns et al. | |
| 10,844,948 B2 * | 11/2020 | De Meerschman | F16H 57/045 |
| 11,002,356 B2 * | 5/2021 | Tochtermann | F16H 57/0409 |
| 11,181,181 B1 * | 11/2021 | Zhou | F16H 57/0413 |
| 2005/0034925 A1 * | 2/2005 | Flamang | F16H 57/0434 184/6.12 |
| 2006/0056958 A1 * | 3/2006 | Gaines | F01D 25/18 415/115 |
| 2013/0074629 A1 * | 3/2013 | Huikko | F16H 57/0413 74/467 |
| 2016/0369886 A1 | 12/2016 | Sterns | |
| 2022/0074486 A1 * | 3/2022 | Raisch | F16H 57/0483 |

* cited by examiner

OIL SUPPLY SYSTEM WITH VACUUM PUMP FOR TRANSMISSION OF DRIVE SYSTEM

CROSS-REFERENCE TO RELATED APPLICATIONS

This application claims priority pursuant to 35 U.S.C. 119(a) to European Patent Application No. 21306075.9, filed Jul. 30, 2021, which application is incorporated herein by reference in its entirety.

TECHNICAL FIELD

The disclosure relates generally to transmissions and, more particularly, to an oil supply system having a vacuum pump for a transmission of a drive system.

BACKGROUND

Drive systems are used throughout industry to power a load. The load may include, for example, a compressor, a pump, or a generator associated with a gas turbine used to generate electricity. The drive system includes a transmission coupled between a drive unit and the load. The drive unit can be any form of system to deliver power, such as an engine, a motor, or a turbine. The transmission converts power supplied by the drive unit and delivers the power of the drive unit to the load. The transmission can include a gear box.

Transmissions operate at high speeds and may be responsible for power losses due to windage or aerodynamic effects. The transmission includes a transmission casing that may be divided into two or more portions. A first portion of the casing may operate under vacuum or partial vacuum, while the rest of the casing may operate under atmospheric pressure. For example, meshing gears may be positioned in a first portion to operate under a vacuum or partial vacuum, while bearings may be positioned in a second portion to operate under atmospheric pressure. The vacuum or partial vacuum reduces the aerodynamic turbulence and the heat generated by the transmission operation and reduces the power losses of the system. The oil supply may be adjusted to take into account the reduced cooling required.

Typically, an oil return pump returns the oil from the one or both portions of the casing to one or more oil receptacles. In another approach, where a portion of the casing is evacuated or partially evacuated by a pump, oil supplied to the moving components located in the evacuated or partially evacuated portion of the casing is collected in a separate tank. An oil return (scavenging) pump returns the oil from this separate tank to an oil receptacle. Each of the above-described approaches require an oil return (scavenging) pump to draw oil from the casing portions back to the oil receptacles, which can add cost and complexity to the drive system.

BRIEF DESCRIPTION

All aspects, examples and features mentioned below can be combined in any technically possible way.

An aspect of the disclosure provides an oil supply system for a transmission of a drive system, the oil supply system comprising: a first oil receptacle collecting oil from a transmission casing of the transmission via a first oil return line; a second oil receptacle collecting oil from at least one other portion of the drive system via at least one second oil return line; an oil supply line and an oil supply pump connected to at least one of the first oil receptacle and the second oil receptacle supplying oil to the transmission casing and the at least one other portion of the drive system; a gas check valve in a first coupling line that fluidly couples the first oil receptacle to the second oil receptacle above a maximum fill level of both receptacles, the gas check valve operative by application of a pressure differential to prevent gas from flowing from the second oil receptacle to the first oil receptacle; and a vacuum pump operatively coupled to the first oil receptacle and the second oil receptacle for selectively generating the pressure differential between the first oil receptacle and the second oil receptacle, such that the vacuum pump generates a negative pressure inside the first oil receptacle and inside the transmission casing connected to the first oil receptacle via the first oil return line.

Another aspect of the disclosure includes any of the preceding aspects and further comprises an oil check valve in a second coupling line that fluidly couples the first oil receptacle to the second oil receptacle adjacent a bottom of both receptacles, the oil check valve operative by application of the pressure differential to prevent oil from flowing from the second oil receptacle to the first oil receptacle.

Another aspect of the disclosure includes any of the preceding aspects and further comprises an oil regulating valve in a third coupling line that fluidly couples the first oil receptacle to the second oil receptacle, the oil regulating valve selectively allowing oil to flow between the first oil receptacle and the second oil receptacle.

Another aspect of the disclosure includes any of the preceding aspects, and, in an atmospheric operation mode, the vacuum pump, the gas check valve, and the oil check valve are inoperative, and the oil regulating valve is open, allowing oil and gas to flow freely between the first oil receptacle and the second oil receptacle.

Another aspect of the disclosure includes any of the preceding aspects, and, in a vacuum operation mode, the vacuum pump is operative to apply the pressure differential, the oil check valve is operative to prevent oil from flowing from the second oil receptacle to the first oil receptacle, and the gas check valve is operative to prevent gas from flowing from the second oil receptacle to the first oil receptacle, wherein the pressure differential generates a positive pressure in the second oil receptacle and the negative pressure in the first oil receptacle and the transmission casing indirectly through the first oil receptacle and the first oil return line.

Another aspect of the disclosure includes any of the preceding aspects, and, in the vacuum operation mode, the oil regulating valve is operative to maintain a level of oil in the first oil receptacle below a threshold level.

Another aspect of the disclosure includes any of the preceding aspects, and the oil supply pump includes a first oil supply pump connected to the first oil receptacle, and a second oil supply pump connected to the second oil receptacle.

Another aspect of the disclosure includes any of the preceding aspects, and in an atmospheric operation mode, the vacuum pump, the gas check valve, and the oil check valve are inoperative, allowing oil and gas to flow freely between the first oil receptacle and the second oil receptacle.

Another aspect of the disclosure includes any of the preceding aspects, and, in a vacuum operation mode, the vacuum pump is operative to apply the pressure differential, the oil check valve is operative to prevent oil from flowing from the second oil receptacle to the first oil receptacle, and the gas check valve is operative to prevent gas from flowing from the second oil receptacle to the first oil receptacle, wherein the pressure differential generates a positive pressure in the second oil receptacle and the negative pressure in the first oil receptacle and the transmission casing indirectly through the first oil receptacle and the first oil return line.

Another aspect of the disclosure includes any of the preceding aspects, and in the vacuum operation mode, the first oil supply pump is operative to maintain a level of oil in the first oil receptacle below a threshold level.

Another aspect of the disclosure includes any of the preceding aspects, and oil passes through the first oil return line and the at least one second oil return line via gravity.

Another aspect of the disclosure includes any of the preceding aspects, and further comprises a gas processing device associated with the second oil receptacle for reducing oil mist in the second oil receptacle.

Another aspect of the disclosure includes a drive system, comprising: a load; a drive unit providing a driving power; a transmission connected between the drive unit and the load to convert the driving power provided by the drive unit and to supply the driving power to the load, the transmission including a transmission casing; a bearing casing housing a bearing for rotatably supporting a rotating shaft of at least one of the load, the drive unit and the transmission; an oil supply system including: a first oil receptacle collecting oil from the transmission casing via a first oil return line; a second oil receptacle collecting oil from at least one of: the load, the drive unit, and the bearing casing, via at least one second oil return line; an oil supply line and an oil supply pump connected to at least one of the first oil receptacle and the second oil receptacle supplying oil to the transmission casing and at least one of the load, the drive unit, and the bearing casing; a gas check valve in a first coupling line that fluidly couples the first oil receptacle to the second oil receptacle above a maximum fill level of both receptacles, the gas check valve operative by application of a pressure differential to prevent gas from flowing from the second oil receptacle to the first oil receptacle; and a vacuum pump operatively coupled to the first oil receptacle and the second oil receptacle for selectively generating the pressure differential between the first oil receptacle and the second oil receptacle, such that the vacuum pump generates a negative pressure inside the first oil receptacle and inside the transmission casing connected to the first oil receptacle via the first oil return line.

Another aspect of the disclosure includes any of the preceding aspects, and further comprises an oil check valve in a second coupling line that fluidly couples the first oil receptacle to the second oil receptacle adjacent a bottom of both receptacles, the oil check valve operative by application of the pressure differential to prevent oil from flowing from the second oil receptacle to the first oil receptacle.

Another aspect of the disclosure includes any of the preceding aspects, and further comprises an oil regulating valve in a third coupling line that fluidly couples the first oil receptacle to the second oil receptacle, the oil regulating valve selectively allowing oil to flow between the first oil receptacle and the second oil receptacle.

Another aspect of the disclosure includes any of the preceding aspects, and in an atmospheric operation mode, the vacuum pump, the gas check valve, and the oil check valve are inoperative, and the oil regulating valve is open, allowing oil and gas to flow freely between the first oil receptacle and the second oil receptacle; and in a vacuum operation mode, the vacuum pump is operative to apply the pressure differential, the oil check valve is operative to prevent oil from flowing from the second oil receptacle to the first oil receptacle, and the gas check valve is operative to prevent gas from flowing from the second oil receptacle to the first oil receptacle, wherein the pressure differential generates a positive pressure in the second oil receptacle and the negative pressure in the first oil receptacle and the transmission casing indirectly through the first oil receptacle and the first oil return line.

Another aspect of the disclosure includes any of the preceding aspects, and in the vacuum operation mode, the oil regulating valve is operative to maintain a level of oil in the first oil receptacle below a threshold level.

Another aspect of the disclosure includes any of the preceding aspects, and the oil supply pump includes a first oil supply pump connected to the first oil receptacle and a second oil supply pump connected to the second oil receptacle.

Another aspect of the disclosure includes any of the preceding aspects, and in an atmospheric operation mode, the vacuum pump, the gas check valve, and the oil check valve are inoperative, allowing oil and gas to flow freely between the first oil receptacle and the second oil receptacle; and, in a vacuum operation mode, the vacuum pump is operative to apply the pressure differential, the oil check valve is operative to prevent oil from flowing from the second oil receptacle to the first oil receptacle, the gas check valve is operative to prevent gas from flowing from the second oil receptacle to the first oil receptacle, and the second oil supply pump is operative to maintain a level of the first oil receptacle below a threshold level, wherein the pressure differential generates a positive pressure in the second oil receptacle and the negative pressure in the first oil receptacle and the transmission casing indirectly through the first oil receptacle and the first oil return line.

Another aspect of the disclosure includes any of the preceding aspects, and oil passes through the first oil return line and the at least one second oil return line via gravity.

Two or more aspects described in this disclosure, including those described in this summary section, may be combined to form implementations not specifically described herein.

The details of one or more implementations are set forth in the accompanying drawings and the description below. Other features, objects, and advantages will be apparent from the description and drawings and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
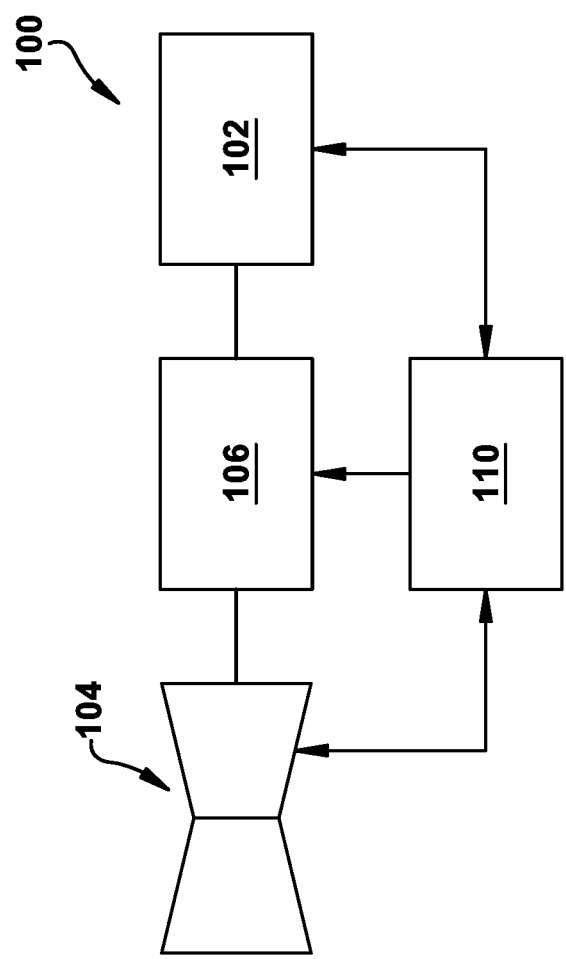
FIG. 1 is a schematic block diagram of a drive system according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within drive system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as an oil flowing through the oil supply system. The term "downstream" corresponds to the direction of flow of the fluid, and the term "upstream" refers to the direction opposite to the flow (i.e., the direction from which the flow originates).

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, indicate the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides an oil supply system with a vacuum pump for a transmission of a drive system and a related drive system. The oil may be any now known or later developed liquid for lubricating and/or cooling moving parts. The oil supply system may include a first oil receptacle collecting oil from a transmission casing via a first oil return line and a second oil receptacle collecting oil from any number of other portions of the drive system, such as but not limited to the load, drive train, or bearing casing(s), via at least one second return line. The portions of the drive system using the oil can be fluidly separated. An oil supply line and an oil supply pump are connected to at least one of the oil receptacles supplying oil to the parts of the drive system. A vacuum pump is operatively coupled to the first oil receptacle for selectively generating a positive pressure in the second oil receptacle and a negative pressure in the first oil receptacle and the transmission casing indirectly through the first oil receptacle and the first oil return line. A gas check valve in a first coupling line fluidly couples the oil receptacles above a maximum fill level of both receptacles and prevents gas from flowing from the second oil receptacle to the first oil receptacle when a pressure differential is applied to the oil receptacles by the vacuum pump. An oil check valve may be in a second coupling line that fluidly couples the first oil receptacle to the second oil receptacle adjacent a bottom of both receptacles. The oil check valve is also operative by application of the pressure differential to prevent oil from flowing from the second oil receptacle to the first oil receptacle. The oil supply system removes the need for oil return (scavenging) pumps on portions of the drive system, reducing costs and complexity. The system also does not require any intermediate tanks.

FIG. 1 shows a schematic block diagram of a drive system 100 according to embodiments of the disclosure. Drive system 100 includes a load 102, a drive unit 104 providing driving power, a transmission 106, and an oil supply system 110, as described herein. Load 102 can be any form of machine that uses power, such as but not limited to a generator, a pump, or a compressor. Drive unit 104 can be any form of power delivery machine, such as but not limited to a motor, an engine, or a gas turbine. Transmission 106 is connected between load 102 and drive unit 104 to convert the driving power provided by drive unit 104 and to supply the driving power to load 102, e.g., by changing the torque, speed or other parameter of motor output of drive system 100.

Figure 2:
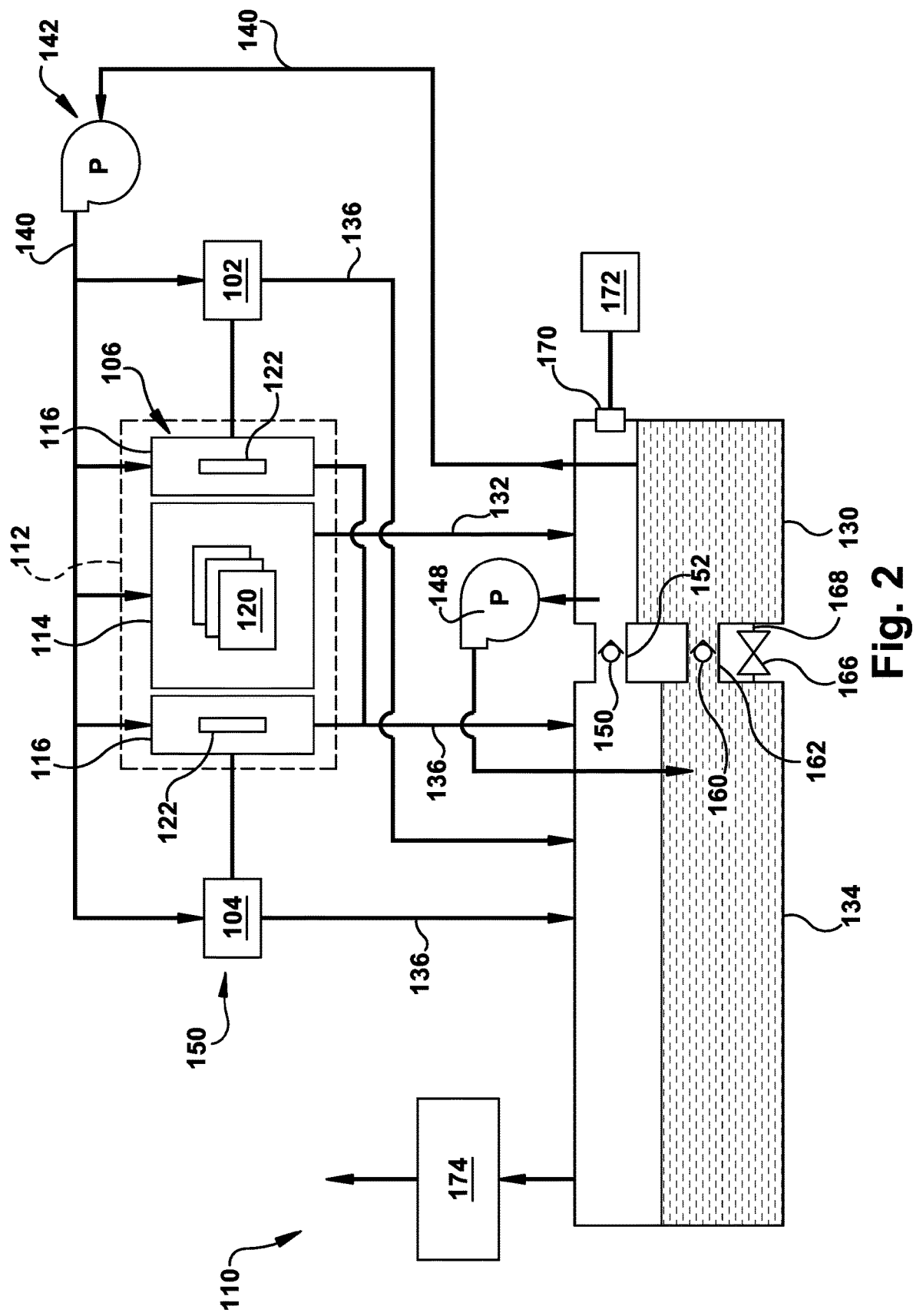
FIG. 2 is a schematic block diagram of an oil supply system according to embodiments of the disclosure.

FIG. 2 shows a schematic block diagram of an oil supply system 110 for drive system 100, according to embodiments of the disclosure. As shown in FIG. 2, transmission 106 may include a transmission housing 112 including, for example, a first (transmission) casing 114 for enclosing meshing gear(s) 120 and a second (bearing) casing 116 for enclosing bearing(s) 122. Transmission casing 114 and bearing casing 116 of transmission housing 112 are fluidly separated, meaning the portions are sealed from one another such that oil returned to either portion does not mix with oil returned to the other. Each transmission casing 114 may enclose any variety of meshing gears 120 that form a transmission, and each bearing casing 116 may enclose any variety of one or more bearings 122. It will be recognized that transmission housing 112 may include a variety of other casings for other moving components requiring lubrication and/or cooling.

In FIG. 2, one transmission casing 114 and two bearing casings 116 are illustrated. It is emphasized, however, that transmission 106 may include any number of casings depending on any number of factors, e.g., number of gears, number of bearings, size of the moving components, size of drive rotor, location of components, and environmental conditions, among other factors. It is also recognized that other portions of drive system 100, such as drive unit 104 and/or load 102, may include any number of oil casings for parts thereof.

Oil supply system 110 may also include a first oil receptacle 130 collecting oil from transmission casing(s) 114 of housing 112 of transmission 106 via a first oil return line(s) 132. Oil supply system 110 may also include a second oil receptacle 134 collecting oil from bearing casing(s) 116 of housing 112 of transmission 106 and any number of other portions of drive system 100, including but not limited to drive unit 104 and load 102, via at least one second return line 136. Oil receptacles 130, 134 may include any now known or later developed form of container, tank, etc., capable of holding an oil.

As will be described herein, oil receptacles 130, 134 may be interconnected in a limited and controlled manner. While one oil return line 132 and three oil return lines 136 are shown, oil return lines 132, 136 may include any number of conduits to collect the oil from any required location, e.g., casings 114, 116, or portion(s) of load 102 and drive unit 104. Notably, oil may pass through first oil return line(s) 132 and second oil return line(s) 136 via gravity. That is, oil passes through oil return lines 132, 136 without the need for one or more scavenging pumps coupled to casings 114, 116 of housing 112 or other portions of drive system 100, which simplifies oil supply system 110.

Oil supply system 110 may also include an oil supply line 140 and an oil supply pump 142 connected to at least one of first oil receptacle 130 and second oil receptacle 134 for supplying oil to transmission casing(s) 114 and bearing casing(s) 116 of transmission housing 112 and to any other required portions of drive system 100. In the FIG. 2 embodiment, oil supply line 140 and oil supply pump 142 are connected to only first oil receptacle 130 for supplying oil to gear box casing(s) 114 and bearing casing(s) 116 of housing 112 and to other portions of drive system 100, e.g., load 102 and drive unit 104. Any number of oil supply lines 140 and oil supply pumps 142 may be employed.

A vacuum pump 148 of oil supply system 110 is operatively coupled to first oil receptacle 130 and second oil receptacle 134 for selectively generating a pressure differential between the oil receptacles 130, 134. More particularly, vacuum pump 148 may selectively generate a positive pressure in second oil receptacle 134 and a negative pressure in first oil receptacle 130 during a vacuum operation mode of oil supply system 110. Vacuum pump 148 also generates a negative pressure in transmission casing 114 of housing 112 indirectly through first oil receptacle 130 and first oil return line 132. First oil receptacle 130, first oil return line 132, and transmission casing 114 are in direct fluid communication with one another, i.e., with no pump or other flow preventing structure therein. Vacuum pump 148 may be any now known or later developed form of pump capable of generating a pressure differential between oil receptacles 130, 134. In the example shown, vacuum pump 148 is fluidly coupled via one or more conduits to each oil receptacle 130, 134.

Oil supply system 110 also includes a gas check valve 150 in a coupling line 152 that fluidly couples first oil receptacle 130 to second oil receptacle 134 above a maximum fill level of both receptacles 130, 134. When activated by a pressure differential generated by vacuum pump 148, gas check valve 150 is operative to prevent gas, such as air or an air/oil mixture, from flowing from second oil receptacle 134 to first oil receptacle 130, i.e., the differential pressure causes it to close. Gas check valve 150 thus may selectively prevent the negative pressure applied by vacuum pump 148 to first oil receptacle 130 from being applied to second oil receptacle 134 through coupling line 152 when vacuum pump 148 is operated. Similarly, gas check valve 150 may selectively prevent the positive pressure applied by vacuum pump 148 to second oil receptacle 134 from being applied to first oil receptacle 130 through coupling line 152 when vacuum pump 148 is operated.

Oil supply system 110 may also include an oil check valve 160 in a coupling line 162 that fluidly couples first oil receptacle 130 to second oil receptacle 134 adjacent or proximate to a bottom of both receptacles (that is, below a minimum fill level of both receptacles 130, 134). Oil check valve 160 is operative to prevent oil from flowing from second oil receptacle 134 to first oil receptacle 130 when a differential pressure is applied by vacuum pump 148, i.e., causing the check valve to close. That is, oil check valve 160 is operative by application of the pressure differential by vacuum pump 148 to prevent oil from flowing from second oil receptacle 134 to first oil receptacle 130.

Oil supply system 110 may also include an oil regulating valve 166 in a coupling line 168 that fluidly couples first oil receptacle 130 to second oil receptacle 134. Oil regulating valve 166 selectively allows oil to flow between first oil receptacle 130 and second oil receptacle 134, e.g., to maintain a level in first oil receptacle 130 below a threshold level. Any form of level sensor 170 may be employed with a controller 172 to operate oil regulating valve 166. Controller 172 may be part of any now known or later developed transmission control, e.g., a programmable control. Controller 172 may also control other components of oil supply systems described herein, e.g., valves, pumps, etc.

Coupling line 168 is adjacent a bottom of each receptacle 130, 134, allowing any oil therein to readily move between receptacles 130, 134 as allowed by oil regulating valve 166. Regulating valve 166 and coupling line 168 are shown below oil check valve 160 and coupling line 162 for illustration purposes. The coupling lines 162, 168 may be at the same or similar levels relative to a bottom of oil receptacles 130, 134 to accommodate oil flow between oil receptacles 130, 134.

Oil supply system 110 also may include a gas processing device 174 associated with the second oil receptacle 134 for cleaning gas, e.g., air or air/oil mixture, in second oil receptacle 134. Gas processing device 174 may include any now known or later developed oil mist reduction device, such as a gas bypass valve, to allow some gas circulation and to control pressure inside second oil receptacle 134 when vacuum pump 148 applies a pressure differential. For example, gas processing device 174 may prevent over-pressurization.

In operation, oil supply system 110 may operate in a vacuum operation mode or an atmospheric operation mode. In any mode, oil supply pump(s) 142 supplies oil to transmission casing 114, bearing casing 116, and other portions of drive system 100 from first oil receptacle 130. While not shown in detail, it will be recognized that the oil from oil supply pump(s) 142 may be pumped, cooled, and filtered as part of the process of supplying the oil to the stated parts. Oil from parts of drive system 100 to oil receptacles 130, 134 is communicated by gravity, i.e., without scavenging pumps. For example, oil from bearing casing(s) 116 of housing 112 is communicated to second oil receptacle 134 by gravity, and oil from transmission casing(s) 114 of housing 112 is communicated to first oil receptacle 130 by gravity. As will be described, oil in second oil receptacle 134 may be mixed with oil in first oil receptacle 130 prior to being pumped to casings 114, 116 by oil supply pump(s) 142.

In the vacuum operation mode, vacuum pump 148 is operative to apply the pressure differential between first oil receptacle 130 and second oil receptacle 134. The pressure applied may vary depending on, for example, the size of the pump, transmission size, and system layout, among a number of other factors. Oil regulating valve 166 is operative to maintain a level of oil in first oil receptacle 130 below a threshold level, i.e., as sensed by level sensor 170. As noted, vacuum pump 148 generates a positive pressure in second oil receptacle 134 and a negative (low) pressure in first oil receptacle 130. The pressure differential causes gas check valve 150 and oil check valve 160 to activate to prevent flow. Hence, the negative pressure is also applied to transmission casing 114 through first oil return line(s) 132. The negative pressure applied to transmission casing 114 within housing 112 reduces power losses, thereby improving overall efficiency and performance of transmission 106.

The atmospheric operation mode may be employed where the vacuum operation mode is not possible, for example, due to a partial or complete failure of vacuum pump 148 or other issue. In the atmospheric operation mode, vacuum pump 148 is inoperative. Consequently, gas check valve 150 and oil check valve 160 are inoperative, meaning neither is restricting flow of gas or oil between oil receptacles 130, 134. Oil regulating valve 166 is also open, allowing oil to flow freely between first oil receptacle 130 and second oil receptacle 134. Thus, pump 142 pulls oil from first oil receptacle 130 for delivery to load 102, drive unit 104, and transmission 106, and oil from these components is gravity-fed to either the first or second oil receptacles 130, 134, as described above.

Figure 3:
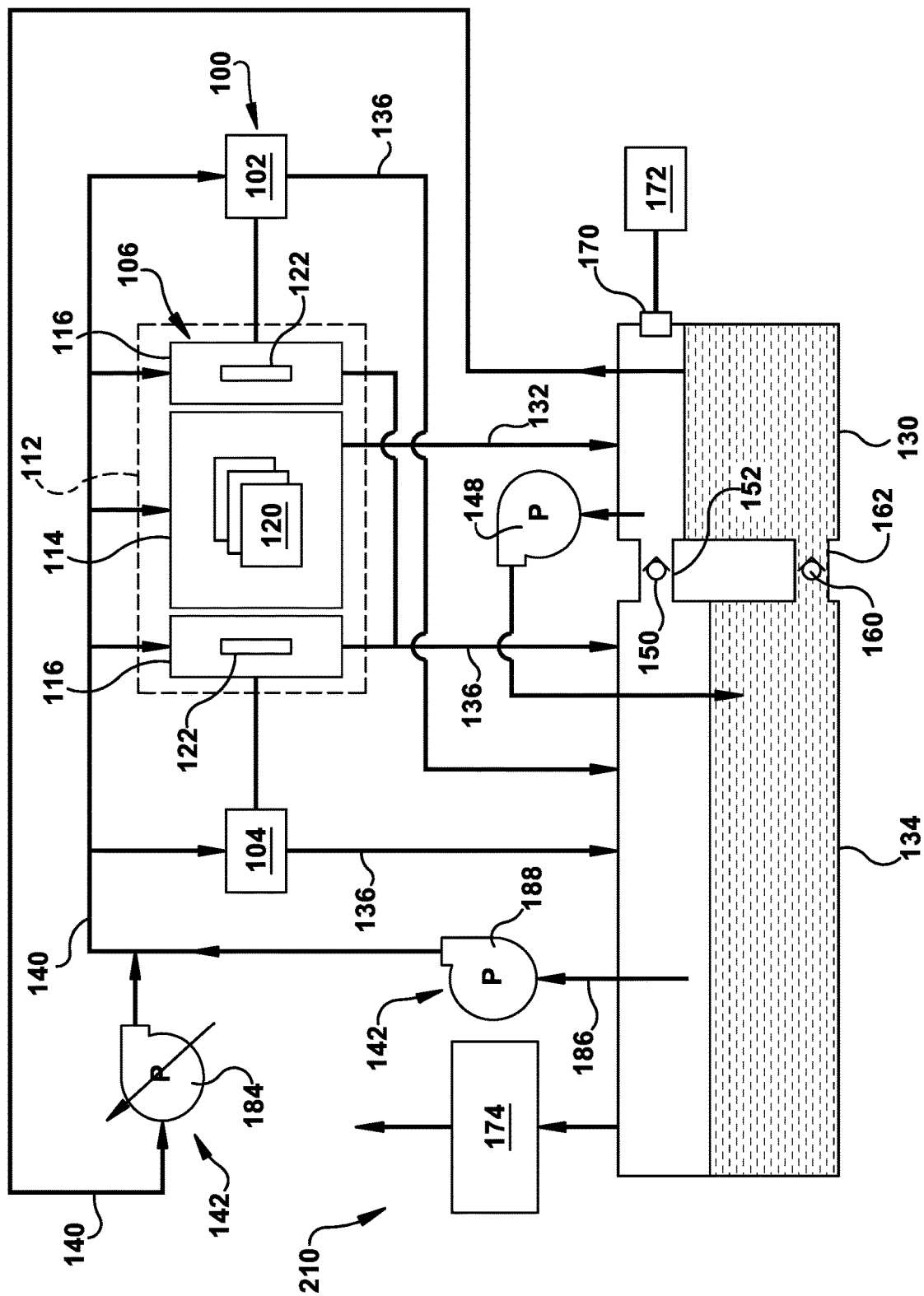
FIG. 3 is a schematic block diagram of an oil supply system according to other embodiments of the disclosure.

FIG. 3 shows a schematic block diagram of another embodiment of an oil supply system 210. Oil supply system 210 is similar to oil supply system 110 (FIG. 2). Oil supply system 210 has an oil supply line and an oil supply pump connected to at least one of first oil receptacle 130 and second oil receptacle 134 (both shown) supplying oil to transmission casing(s) 114 and bearing casing(s) 116 of housing 112, and other portions of drive system 100. However, oil supply system 210 does not include an oil regulating valve 166 (FIG. 2), which is used in the FIG. 2 embodiment to prevent second oil receptacle 134 from sharing oil with first oil receptacle 130 during the vacuum operation mode and to thereby prevent overfill of first oil receptacle 130. To address this situation, oil supply pump 142 includes two pumps, one for each receptacle.

More particularly, in the FIG. 3 embodiment, oil supply system 210 includes a first oil supply line 182 and a first oil supply pump 184 connected to first oil receptacle 130, and a second oil supply line 186 and a second oil supply pump 188 connected to second oil receptacle 134. Oil supply pump 184 may be a variable pump and may be controlled by level sensor 170 in first oil receptacle 130 and controller 172. Oil supply pump 184 is operative to maintain a level of first oil receptacle 130 below a threshold level in the vacuum operation mode. In any event, oil supply pumps 184, 188 supply oil to transmission casing(s) 114 and bearing casing(s) 116 of housing 112 and to other portions of drive system 100. Any number of oil supply lines 182, 186 and pumps 184, 188 may be employed.

In operation, oil supply system 210 may operate in a vacuum (high efficiency) operation mode or an atmospheric operation mode. In the vacuum operation mode, vacuum pump 148 is operative to apply the pressure differential, and oil check valve 160 is operative to prevent oil from flowing from second oil receptacle 134 to first oil receptacle 130. Gas check valve 150 is operative to prevent gas from flowing from second oil receptacle 134 to first oil receptacle 130, and vice versa. Here also, first oil supply pump 184 is operative to draw oil from first oil receptacle 130, and second oil supply pump 188 is operative to draw oil from second oil receptacle 134. As noted, the pressure differential created by vacuum pump 148 generates a positive pressure in second oil receptacle 134, which is trapped therein by gas check valve 150. The negative pressure is applied to first oil receptacle 130 and, by extension, to transmission casing(s) 114 through first oil return line(s) 132. Hence, a negative pressure can be applied to transmission casing(s) 114 to ensure oil contact with gear boxes 120 to reduce power losses. First oil supply pump 184 is also operative to maintain an oil level of first oil receptacle 130 below a threshold level, as described herein.

The atmospheric operation mode of oil supply system 210 may be employed where the vacuum operation mode is not possible or is inadequate, for example, due to a failure of vacuum pump 148 or other issue. In the atmospheric operation mode, vacuum pump 148 is inoperative. Here also, gas check valve 150 and oil check valve 160 are inoperative, allowing oil and gas to flow freely between first oil receptacle 130 and second oil receptacle 134. Oil supply pumps 184, 188 may operate in a normal fashion, e.g., as described elsewhere herein.

Embodiments of oil supply system 110, 210 and drive system 100 including oil supply system 110, 210 provide a number of technical effects and advantages, some of which are listed herein. For example, oil supply system 110, 210 removes the need for oil return (scavenging) pumps on portions of the transmission 106, reducing costs and complexity. Embodiments of systems 110, 210 also do not require any intermediate tanks. Implementations of systems 110, 210 may require no additional controllers than would normally be provided.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. An oil supply system for a transmission of a drive system, the oil supply system comprising:
   a first oil receptacle collecting oil from a transmission casing of the transmission via a first oil return line;
   a second oil receptacle collecting oil from at least one other portion of the drive system via at least one second oil return line;
   an oil supply line and an oil supply pump connected to at least one of the first oil receptacle and the second oil receptacle, the oil supply line and the oil supply pump supplying oil to the transmission casing and the at least one other portion of the drive system;
   a gas check valve in a first coupling line that fluidly couples the first oil receptacle to the second oil receptacle above a maximum fill level of both receptacles, the gas check valve operative by application of a pressure differential between the first oil receptacle and the second oil receptacle to prevent gas from flowing from the second oil receptacle to the first oil receptacle; and
   a vacuum pump operatively coupled to the first oil receptacle and the second oil receptacle for selectively generating the pressure differential between the first oil receptacle and the second oil receptacle, such that the vacuum pump generates a negative pressure inside the first oil receptacle and inside the transmission casing connected to the first oil receptacle via the first oil return line.

2. The oil supply system according to claim 1, further comprising an oil check valve in a second coupling line that fluidly couples the first oil receptacle to the second oil receptacle adjacent a bottom of both receptacles, the oil check valve operative by application of the pressure differential to prevent oil from flowing from the second oil receptacle to the first oil receptacle.

3. The oil supply system according to claim 2, further comprising an oil regulating valve in a third coupling line that fluidly couples the first oil receptacle to the second oil receptacle, the oil regulating valve selectively allowing oil to flow between the first oil receptacle and the second oil receptacle.

4. The oil supply system according to claim 3, wherein, in an atmospheric operation mode, the vacuum pump, the gas check valve, and the oil check valve are inoperative, and the oil regulating valve is open, allowing oil and gas to flow freely between the first oil receptacle and the second oil receptacle.

5. The oil supply system according to claim 3, wherein, in a vacuum operation mode, the vacuum pump is operative to apply the pressure differential, the oil check valve is operative to prevent oil from flowing from the second oil receptacle to the first oil receptacle, and the gas check valve is operative to prevent gas from flowing from the second oil receptacle to the first oil receptacle,
   wherein the pressure differential generates a positive pressure in the second oil receptacle and the negative pressure in the first oil receptacle and the transmission casing indirectly through the first oil receptacle and the first oil return line.

6. The oil supply system according to claim 5, wherein, in the vacuum operation mode, the oil regulating valve is operative to maintain a level of oil in the first oil receptacle below a threshold level.

7. The oil supply system according to claim 2, wherein the oil supply pump includes a first oil supply pump connected to the first oil receptacle, and a second oil supply pump connected to the second oil receptacle.

8. The oil supply system according to claim 7, wherein, in an atmospheric operation mode, the vacuum pump, the gas check valve and the oil check valve are inoperative, allowing oil and gas to flow freely between the first oil receptacle and the second oil receptacle.

9. The oil supply system according to claim 7, wherein, in a vacuum operation mode, the vacuum pump is operative to apply the pressure differential, the oil check valve is operative to prevent oil from flowing from the second oil receptacle to the first oil receptacle, and the gas check valve is operative to prevent gas from flowing from the second oil receptacle to the first oil receptacle,
   wherein the pressure differential generates a positive pressure in the second oil receptacle and the negative pressure in the first oil receptacle and the transmission casing indirectly through the first oil receptacle and the first oil return line, and
   wherein the first oil supply pump is operative to maintain a level of oil in the first oil receptacle below a threshold level.

10. The oil supply system according to any of claim 1, wherein oil passes through the first oil return line and the at least one second oil return line via gravity.

11. The oil supply system according to any of claim 1, further comprising a gas processing device associated with the second oil receptacle for reducing oil mist in the second oil receptacle.

12. A drive system, comprising:
   a load;
   a drive unit providing a driving power;
   a transmission connected between the drive unit and the load to convert the driving power provided by the drive unit and to supply the driving power to the load, the transmission including a transmission casing;
   a bearing casing housing a bearing for rotatably supporting a rotating shaft of at least one of the load, the drive unit, and the transmission;
   an oil supply system including:
      a first oil receptacle collecting oil from the transmission casing via a first oil return line;
      a second oil receptacle collecting oil from at least one of: the load, the drive unit, and the bearing casing, via at least one second oil return line;
      an oil supply line and an oil supply pump connected to at least one of the first oil receptacle and the second oil receptacle, the oil supply line and the oil supply pump supplying oil to the transmission casing and at least one of the load, the drive unit, and the bearing casing;
      a gas check valve in a first coupling line that fluidly couples the first oil receptacle to the second oil receptacle above a maximum fill level of both receptacles, the gas check valve operative by application of a pressure differential between the first oil receptacle and the second oil receptacle to prevent gas from flowing from the second oil receptacle to the first oil receptacle; and
      a vacuum pump operatively coupled to the first oil receptacle and the second oil receptacle for selectively generating the pressure differential between the first oil receptacle and the second oil receptacle, such that the vacuum pump generates a negative pressure inside the first oil receptacle and inside the transmission casing connected to the first oil receptacle via the first oil return line.

13. The drive system according to claim 12, further comprising an oil check valve in a second coupling line that fluidly couples the first oil receptacle to the second oil receptacle adjacent a bottom of both receptacles, the oil check valve operative by application of the pressure differential to prevent oil from flowing from the second oil receptacle to the first oil receptacle.

14. The drive system according to claim 13, further comprising an oil regulating valve in a third coupling line that fluidly couples the first oil receptacle to the second oil receptacle, the oil regulating valve selectively allowing oil to flow between the first oil receptacle and the second oil receptacle.

15. The drive system according to claim 14, wherein:
in an atmospheric operation mode, the vacuum pump, the gas check valve and the oil check valve are inoperative, and the oil regulating valve is open, allowing oil and gas to flow freely between the first oil receptacle and the second oil receptacle; and
in a vacuum operation mode, the vacuum pump is operative to apply the pressure differential, the oil check valve is operative to prevent oil from flowing from the second oil receptacle to the first oil receptacle, the gas check valve is operative to prevent gas from flowing from the second oil receptacle to the first oil receptacle, and the oil regulating valve is operative to maintain a level of oil in the first oil receptacle below a threshold level,
wherein the pressure differential generates a positive pressure in the second oil receptacle and the negative pressure in the first oil receptacle and the transmission casing indirectly through the first oil receptacle and the first oil return line.

16. The drive system according to claim 14, wherein, in the vacuum operation mode, the oil regulating valve is operative to maintain a level of oil in the first oil receptacle below a threshold level.

17. The drive system according to claim 12, wherein the oil supply pump includes a first oil supply pump connected to the first oil receptacle and a second oil supply pump connected to the second oil receptacle.

18. The drive system according to claim 17, wherein, in an atmospheric operation mode, the vacuum pump, the gas check valve, and the oil check valve are inoperative, allowing oil and gas to flow freely between the first oil receptacle and the second oil receptacle; and, in a vacuum operation mode, the vacuum pump is operative to apply the pressure differential, the oil check valve is operative to prevent oil from flowing from the second oil receptacle to the first oil receptacle, the gas check valve is operative to prevent gas from flowing from the second oil receptacle to the first oil receptacle, and the second oil supply pump is operative to maintain a level of the first oil receptacle below a threshold level, wherein the pressure differential generates a positive pressure in the second oil receptacle and the negative pressure in the first oil receptacle and the transmission casing indirectly through the first oil receptacle and the first oil return line.

\* \* \* \* \*